(12) United States Patent
Sejimo

(10) Patent No.: US 11,409,007 B2
(45) Date of Patent: Aug. 9, 2022

(54) COMMUNICATION APPARATUS, COMMUNICATION SYSTEM, COMMUNICATION CONTROL METHOD, AND NON-TRANSITORY COMPUTER READABLE MEDIUM STORING COMMUNICATION CONTROL PROGRAM

(71) Applicant: NEC Corporation, Tokyo (JP)

(72) Inventor: Masaki Sejimo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 16/877,750

(22) Filed: May 19, 2020

(65) Prior Publication Data

US 2020/0371190 A1 Nov. 26, 2020

(30) Foreign Application Priority Data

May 23, 2019 (JP) .............................. JP2019-096939

(51) Int. Cl.
| | | |
|---|---|---|
| *G01S 19/51* | (2010.01) | |
| *H04W 12/37* | (2021.01) | |
| *H04W 12/64* | (2021.01) | |
| *G01S 19/16* | (2010.01) | |

(52) U.S. Cl.
CPC .............. *G01S 19/51* (2013.01); *G01S 19/16* (2013.01); *H04W 12/37* (2021.01); *H04W 12/64* (2021.01)

(58) Field of Classification Search
CPC .......... G01S 19/51; G01S 19/42; G01S 19/16; H04W 12/37; H04W 12/64
See application file for complete search history.

(56) References Cited

U.S. PATENT DOCUMENTS

| | | | | |
|---|---|---|---|---|
| 6,011,973 | A * | 1/2000 | Valentine | H04W 48/04 455/457 |
| 6,556,819 | B2 * | 4/2003 | Irvin | H04W 12/30 455/418 |
| 7,058,358 | B2 * | 6/2006 | Cannon | H04W 12/08 455/410 |
| 7,835,721 | B2 * | 11/2010 | Tuulos | H04L 63/105 726/19 |
| 2002/0137524 | A1 * | 9/2002 | Bade | H04W 12/08 455/12.1 |

FOREIGN PATENT DOCUMENTS

| | | |
|---|---|---|
| JP | 2002-236619 A | 8/2002 |
| JP | 2019-057788 A | 4/2019 |
| WO | 2018/012082 A1 | 1/2018 |

* cited by examiner

*Primary Examiner* — Gregory C. Issing
(74) *Attorney, Agent, or Firm* — Sughrue Mion, PLLC

(57) ABSTRACT

A communication apparatus calculates information about a position of the communication apparatus based on a GPS radio wave and registers the calculated information about the position as an installation position of the communication apparatus when a measured strength of the GPS radio wave is equal to or stronger than a predetermined strength, when the measured strength of the GPS radio wave is equal to or stronger than the predetermined strength, periodically calculates the information about the position of the communication apparatus based on the GPS radio wave or the like, uses the calculated information of the position as a current position of the communication apparatus, compares the current position of the communication apparatus with the registered installation position of the communication apparatus.

9 Claims, 8 Drawing Sheets

COMMUNICATION APPARATUS, COMMUNICATION SYSTEM, COMMUNICATION CONTROL METHOD, AND NON-TRANSITORY COMPUTER READABLE MEDIUM STORING COMMUNICATION CONTROL PROGRAM

INCORPORATION BY REFERENCE

This application is based upon and claims the benefit of priority from Japanese patent application No. 2019-096939, filed on May 23, 2019, the disclosure of which is incorporated herein in its entirety by reference.

TECHNICAL FIELD

The present disclosure relates to a communication apparatus, a communication system, a communication control method, and a communication control program. In particular, the present disclosure relates to a communication apparatus, a communication system, a communication control method, and a communication control program for anti-theft measures.

BACKGROUND ART

Radio communication apparatuses disposed in streets and fields are at risk of thefts. There is a problem that when such an apparatus being used is stolen and resold, the apparatus is reused in a place where the apparatus has been illegally taken to. Therefore, in order to deter such thefts, there is a need to prevent such stolen apparatuses from being reused. Accordingly, there are demands for a mechanism for deterring a thief from stealing such an apparatus for the purpose of reusing it in other networks.

International Patent Publication No. WO2018/012082 discloses a determination apparatus including: target information acquisition means for acquiring information about a current position of an energy storage system; position information acquisition means for acquiring an installation position associated with each energy storage system; and determination means for determining whether or not the energy storage system is installed at the installation position based on the information about the current position of the energy storage system. In this way, it is possible to detect that the energy storage system is stolen and used in a different place. Therefore, it is also possible to find and retrieve the stolen energy storage system.

Japanese Unexamined Patent Application Publication No. 2002/236619 discloses a security processing apparatus including: a resource for a security function; position information acquisition means for periodically acquiring information about a current position; abnormality determination means for determining an abnormality by comparing the information about the current position acquired by the position information acquisition means with information about a predetermined position; and self-destruction means for erasing the resource for the security function when the abnormality is determined by the abnormality determination means. In this way, it is possible to provide a more reliable tamper-resistant function.

Japanese Unexamined Patent Application Publication No. 2019/57788 discloses a communication apparatus including: a transmission/reception unit having a function of transmitting/receiving data to/from another communication apparatus connected to a network; an acquisition unit that acquires information for authenticating a network management apparatus managing the network from the network management apparatus; and a control unit that stops the function of the transmission/reception unit when it cannot acquire the information from the network management apparatus within a predetermined time upon power-up.

In International Patent Publication No. WO2018/012082 and Japanese Unexamined Patent Application Publication No. 2002-236619, there is a problem that a theft cannot be detected when GPS radio waves cannot be received, such as when the apparatus is used indoors or when a radio-wave obstacle exists between a GPS satellite and the communication apparatus or between an indoor GPS and the communication apparatus.

Further, in Japanese Unexamined Patent Application Publication No. 2019-57788, there is a possibility that when an interruption of the power supply due to a power failure and an interruption of communication between the communication apparatus and the management apparatus due to a network trouble occur at the same time, false detection indicating that the communication apparatus has been stolen may occur, though in reality it is a mere trouble. If it is determined that, though in reality the communication apparatus has not actually been stolen, the communication apparatus has been stolen and hence the apparatus has been made unusable because of such a false detection, a communication failure may occur, thus possibly causing a huge loss. The problem is that the efficiency of the operation performed by the communication apparatus deteriorates.

SUMMARY

The present disclosure has been made to solve the above-described problem and an object thereof is to provide a communication apparatus, a communication system, a communication control method, and a communication control program capable of recognizing an environment (GPS availability) and switching a theft detection method to one suitable for the recognized environment.

A communication apparatus according to a first aspect of the present disclosure includes:

a transmission/reception unit having a function of transmitting/receiving data to/from another communication apparatus connected to a network;

an acquisition unit configured to acquire information for authenticating a network management apparatus from the network management apparatus, the network management apparatus being configured to manage the network;

a GPS reception unit configured to receive a GPS radio wave;

a measurement unit configured to measure a strength of the GPS radio wave;

a registration unit configured to calculate information about a position of the communication apparatus based on the GPS radio wave and registers the calculated information about the position as an installation position of the communication apparatus when the strength of the GPS radio wave measured by the measurement unit is equal to or stronger than a predetermined strength; and a control unit configured to, when the strength of the GPS radio wave measured by the measurement unit is equal to or stronger than the predetermined strength, periodically calculate the information about the position of the communication apparatus based on the GPS radio wave or the like, use the calculated information of the position as a current position of the communication apparatus, compare the current position of the communication apparatus with the registered installation position of the communication apparatus, and when the current position is located outside a predetermined area including the installation position, suspend the function of the transmission/reception unit, and further configured to, when the strength of the GPS radio wave measured by the measurement unit is weaker than the predetermined strength, suspends the function of the transmission/reception unit when the acquisition unit cannot acquire the information from the network management apparatus within a predetermined time upon power-up.

A communication system according to a second aspect of the present disclosure includes: the above-described communication apparatus; and a network management apparatus configured to transmit the information for the authentication.

A method for controlling communication according to a third aspect of the present disclosure is a method for controlling communication performed by a communication apparatus configured to transmit/receive data to/from another communication apparatus connected to a network managed by a network management apparatus, the method including:

measuring a strength of a GPS radio wave;

calculating information about a position of the communication apparatus based on the GPS radio wave and registers the calculated information about the position as an installation position of the communication apparatus when the strength of the GPS radio wave is equal to or stronger than a predetermined strength;

periodically calculating, when the measured strength of the GPS radio wave is equal to or stronger than the predetermined strength, the information about the position of the communication apparatus based on the GPS radio wave or the like, using the calculated information of the position as a current position of the communication apparatus, comparing the current position of the communication apparatus with the registered installation position of the communication apparatus, and when the current position is located outside a predetermined area including the installation position, stopping a function of transmitting/receiving data to/from another communication apparatus connected to a network; and suspending, when the measured strength of the GPS radio wave is weaker than the predetermined strength, the function of transmitting/receiving data to/from the other communication apparatus connected to the network when information for authenticating the network management apparatus cannot be acquired from the network management apparatus within a predetermined time upon power-up.

A communication control program according to a fourth aspect of the present disclosure is a communication control program for a communication apparatus configured to transmit/receive data to/from another communication apparatus connected to a network managed by a network management apparatus, the communication control program being adapted to cause a computer to perform:

a process of measuring a strength of a GPS radio wave;

a process of calculating information about a position of the communication apparatus based on the GPS radio wave and registers the calculated information about the position as an installation position of the communication apparatus when the strength of the GPS radio wave is equal to or stronger than a predetermined strength;

a process of periodically calculating, when the measured strength of the GPS radio wave is equal to or stronger than the predetermined strength, the information about the position of the communication apparatus based on the GPS radio wave or the like, using the calculated information of the position as a current position of the communication apparatus, comparing the current position of the communication apparatus with the registered installation position of the communication apparatus, and when the current position is located outside a predetermined area including the installation position, stopping a function of transmitting/receiving data to/from another communication apparatus connected to a network; and a process of suspending, when the measured strength of the GPS radio wave is weaker than the predetermined strength, the function of transmitting/receiving data to/from the other communication apparatus connected to the network when information for authenticating the network management apparatus cannot be acquired from the network management apparatus within a predetermined time upon power-up.

BRIEF DESCRIPTION OF DRAWINGS

The above and other aspects, features and advancements of the present disclosure will become more apparent from the following description of certain experimental artifacts when taken in conjugation with the accompanying drawings, in which.

EMBODIMENTS

First Example Embodiment

Figure 1:
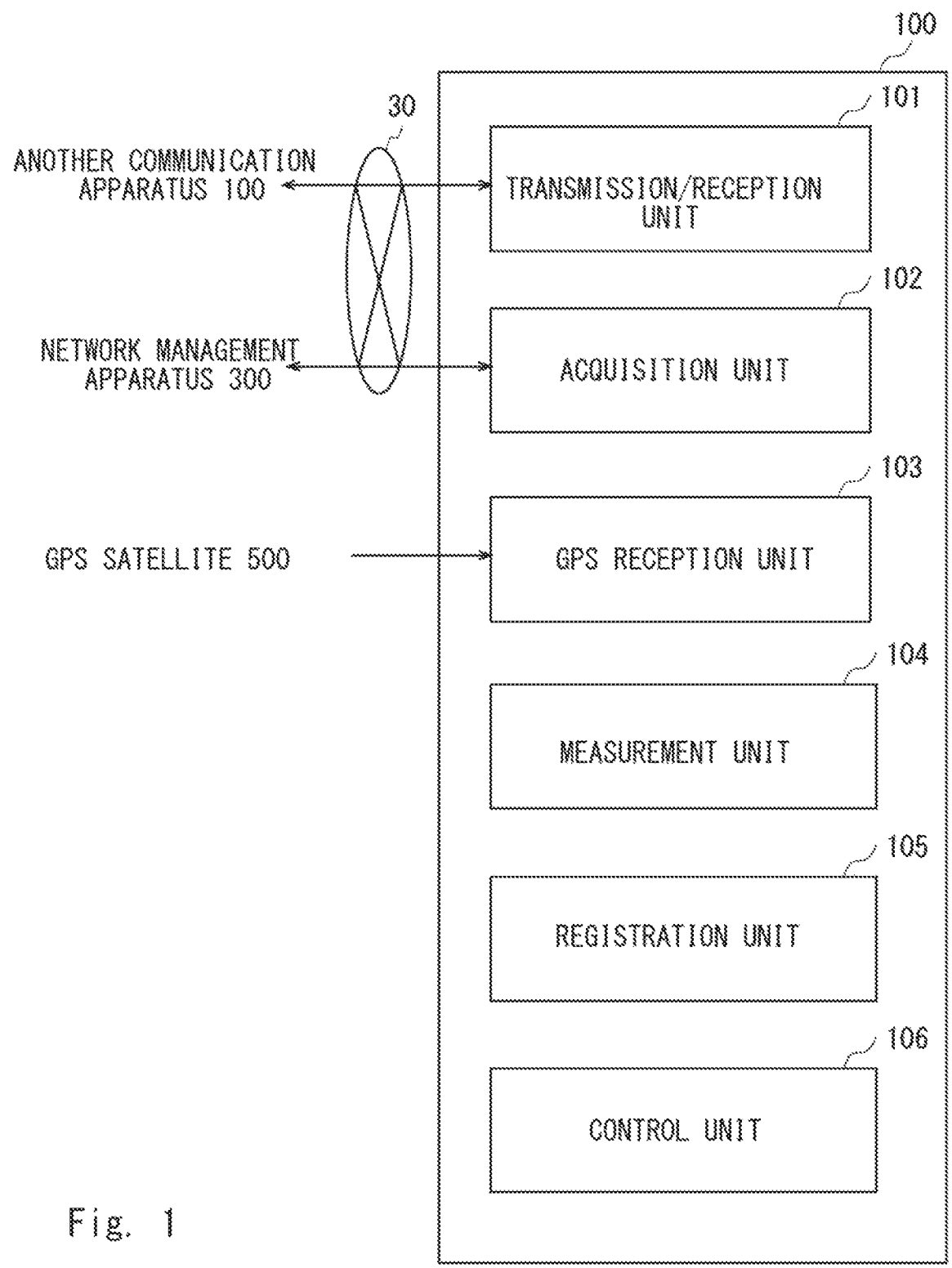
FIG. 1 is a block diagram showing a configuration of a communication apparatus according to a first example embodiment.

Example embodiments according to the present disclosure will be described hereinafter with reference to the drawings. FIG. 1 is a block diagram showing a configuration of a communication apparatus according to a first example embodiment.

The communication apparatus 100 is connected to a network 30 managed by a network management apparatus 300. Communication apparatuses other than the communication apparatus 100 are also connected to the network 30. The communication apparatus 100 may be, for example, a server, a client computer, or a switch.

The communication apparatus 100 authenticates the network management apparatus 300 by acquiring information for authentication, for example, identification information of the network management apparatus 300, from the network management apparatus 300, checking whether the network management apparatus 300 is an assumed one, and responding to the network management apparatus 300. Note that the authentication is not limited to those in which the communication apparatus 100 authenticates the network management apparatus 300. That is, the authentication may be one in which the communication apparatus 100 and the network management apparatus 300 authenticate each other. The communication apparatus 100 has a function of performing various types of control based on various programs stored in a storage unit, and is implemented by a processor (e.g., a central processing unit (CPU)), a read-only memory (ROM), a random access memory (RAM), an input/output port (I/O), etc.

As shown in FIG. 1, the communication apparatus 100 includes a transmission/reception unit 101, an acquisition unit 102, a GPS reception unit 103, a measurement unit 104, a registration unit 105, and a control unit 106. The transmission/reception unit 101 has a function of transmitting/receiving data to/from other communication apparatuses connected to the network 30. The acquisition unit 102 acquires information for authenticating the network management apparatus 300, which manages the network 30, from the network management apparatus 300. The acquisition unit 102 communicates with the network management apparatus 300 by using a known security mechanism such SSL (Secure Sockets Layer)/TLS (Transport Layer Security) or IPsec (IP Security). In this way, the communication apparatus 100 prevents impersonation, eavesdropping, and tampering when it authenticates the network management apparatus 300. When the acquisition unit 102 acquires the information for the authentication from the network management apparatus 300, it checks whether or not the network management apparatus 300 is an assumed one. Then, when the network management apparatus 300 is an assumed one, the acquisition unit 102 responds to the network management apparatus 300.

Examples of the network include a local area network (LAN) and a wide area network (WAN), and the Internet. Further, the communication network may be implemented by using an arbitrary known network protocol, including various types of wired or wireless protocols, such as Ethernet (Registered Trademark), Universal Serial Bus (USB), FIREWIRE (Registered Trademark), Global System for Mobile Communications (GSM (Registered Trademark)), Enhanced Data GSM (Registered Trademark) Environment (EDGE), Code Division Multiple Access (CDMA), Time Division Multiple Access (TDMA), Bluetooth (Registered Trademark), Wi-Fi (Registered Trademark), Voice over Internet Protocol (VoIP), WiMAX (Registered Trademark), or other types of arbitrary suitable communication protocols.

Further, the acquisition unit 102 measures a non-communication time during which no communication is performed between the communication apparatus 100 and the network management apparatus 300 upon power-up. The acquisition unit 102 starts measuring the non-communication time when the communication apparatus 100 is powered on. Further, the acquisition unit 102 stores the non-communication time during which no communication is performed with the network management apparatus 300 as information indicating a communication state between the communication apparatus 100 and the network management apparatus 300.

The information indicating the communication state may include, as information indicating a predetermined time for determining whether the communication apparatus has been stolen, a threshold for the non-communication time during which no communication is performed with the network management apparatus 300. The threshold for the non-communication time may be set by, for example, a user operation and stored in a non-volatile memory of the acquisition unit 102. The non-volatile memory can store (i.e., retain) the data even when an interruption of the electric power to the communication apparatus occurs and hence no electric power is supplied to the non-volatile memory.

The GPS receiver 103 receives a GPS radio wave(s) from a GPS (Global Positioning System) satellite(s) or an indoor GPS(s). The measurement unit 104 measures the strength of the received GPS radio wave. When the strength of the GPS radio wave measured by the measurement unit 104 is equal to or stronger than a predetermined strength, the registration unit 105 calculates information about the position of the communication apparatus 100 based on the GPS radio wave and registers the calculated information about the position as an installation position of the communication apparatus 100. This installation position can be regarded as a place where the communication apparatus 100 is used after the installation.

The control unit 106 periodically calculates the information about the position of the communication apparatus based on the GPS radio wave or the like, uses the calculated information about the position as the current position of the communication apparatus, and compares the current position of the communication apparatus 100 with the registered installation position of the communication apparatus. Then, when the current position is not located within an area including the installation position, the control unit 106 assumes that the communication apparatus 100 has been stolen and hence suspends the function of the transmission/reception unit 101. The area including the installation position may be an area that a user can arbitrarily define. For example, the area including the installation position may be a range defined by the length of a power cord extended from an external power supply, a room in which the communication apparatus is placed, or an area of a network managed by the network management apparatus.

When the strength of the GPS radio wave measured by the measurement unit 104 is weaker than the predetermined strength (i.e., when the GSP radio wave cannot be stably used), the control unit 106 suspends the function of the transmission/reception unit 101 when the acquisition unit 102 cannot acquire the information from the network management apparatus 300 within a predetermined time upon power-up. That is, when the communication apparatus is stolen, the power cord of the communication apparatus is pulled out from the socket (i.e., the communication apparatus is powered off) by the thief and a non-communication time occurs between the communication apparatus and the network management apparatus 300. Therefore, it is determined that the communication apparatus has been stolen by detecting these phenomena.

According to the communication apparatus in accordance with this example embodiment, it is possible to recognize an environment (GPS availability) and switch a theft detection method to one suitable for the recognized environment.

The above-described theft detection method based on the GPS position information will be described in more detailed manner with reference to FIG. 2.

The communication apparatus 100 receives a GPS radio wave(s) from a GPS satellite(s) or an indoor GPS(s). The communication apparatus 100 calculates information about the position of the communication apparatus itself from the received GPS radio wave. The communication apparatus 100 registers the calculated position thereof as an installation position (a position A in FIG. 2). Hereinafter, it is assumed that the communication apparatus 100 is used within a predetermined area including the installation position (the position A in FIG. 2). The communication apparatus 100 can determine whether or not the communication apparatus 100 has been moved from the installation position, i.e., the position where the communication apparatus 100 is originally supposed to be used by periodically receiving the GPS radio wave, calculating information about the current position of the communication apparatus itself, and comparing the calculated current position with the registered installation position thereof. That is, when the current position of the communication apparatus 100 differs from the installation position thereof (i.e., when the current position is located outside a predetermined area including the installation position), the communication apparatus 100 can determine that it has been moved from the installation position to another place (a position B in FIG. 2), i.e., can determine that it has been stolen. The communication apparatus 100, which has been determined to be stolen as described above, interrupts the transmission of a main signal(s), thereby making the communication apparatus itself unusable and thus preventing it from being used for the wrong purpose by the thief.

A theft detection method based on both of an interruption of electric power to a communication apparatus and an interruption of communication between the communication apparatus and a higher-level network management apparatus will be described with reference to FIG. 3.

In this method, it is assumed that when a communication apparatus (NS: Network Element) 100 is taken away for the purpose of a theft, the thief pulls out the power cord of the communication apparatus and thereby temporarily turns off a power supply 200, so that an interruption of communication between the communication apparatus 100 and a higher-level network management apparatus (NMS: Network Management System) 300 occurs. The communication apparatus 100 may be taken away to a place located outside the network managed by the network management apparatus 300 by the thief. Therefore, the communication apparatus 100 measures a non-communication time of communication between the communication apparatus 100 and the network management apparatus 300, and determines, when the communication apparatus 100 is powered on by the thief or the like, that it has been stolen when the non-communication time has already exceeded a threshold. After that, the communication apparatus 100 suspends the communication function of the transmission/reception unit 101, and thereby prevents the stolen communication apparatus 100 itself from being illegally used. The above-described feature will be described hereinafter in a more detailed manner.

The communication between the communication apparatus 100 and the network management apparatus 300 uses a known security mechanism such as SSL (Secure Sockets Layer)/TLS (Transport Layer Security) or IPsec (Security Architecture for Internet Protocol).

When both of an interruption of electric power to the communication apparatus and an interruption of communication between the communication apparatus and a higher-level network management apparatus occur, the communication apparatus 100 detects a theft by itself. The communication apparatus 100 stores a communication state between the communication apparatus 100 and the network management apparatus 300 (e.g., a non-communication time between the communication apparatus and the network management apparatus, a configuration value for a non-communication time threshold for determining a theft) in a non-volatile memory. At the time when the communication apparatus 100 is powered on (at the time of rebooting), when this non-communication time has already exceeded the threshold, the communication apparatus 100 can determine that it has been stolen. The communication apparatus 100, which has been determined to be stolen as described above, interrupts the transmission of a main signal(s), thereby making the communication apparatus itself unusable and thus preventing it from being used for the wrong purpose by the thief. When the theft detection method based on the interruption of communication and the interruption of electric power is used, it is possible to detect a theft even when the communication apparatus is used indoors and hence the GPS radio wave does not reach the communication apparatus, or even when a radio-wave obstacle exists between the GPS satellite/indoor GPS and the communication apparatus and hence the GPS radio wave cannot be accurately received.

In this example embodiment, electric power to the communication apparatus 100 is cut off. Then, after that the control unit 106 acquires the communication state stored in the non-volatile memory of the acquisition unit 102 upon power-up and detects a theft when the non-communication time has already exceeded the threshold. Further, in this example embodiment, when the non-communication time read from the non-volatile memory upon power-up has not exceeded the threshold, the control unit 106 starts measuring the non-communication time. When the sum of the non-communication time that was read upon the power-up and the non-communication time that has been measured after the power-up exceeds the aforementioned threshold for the non-communication time, the control unit 106 determines that the communication apparatus 100 has been stolen and suspends the function of the transmission/reception unit.

Figure 4:
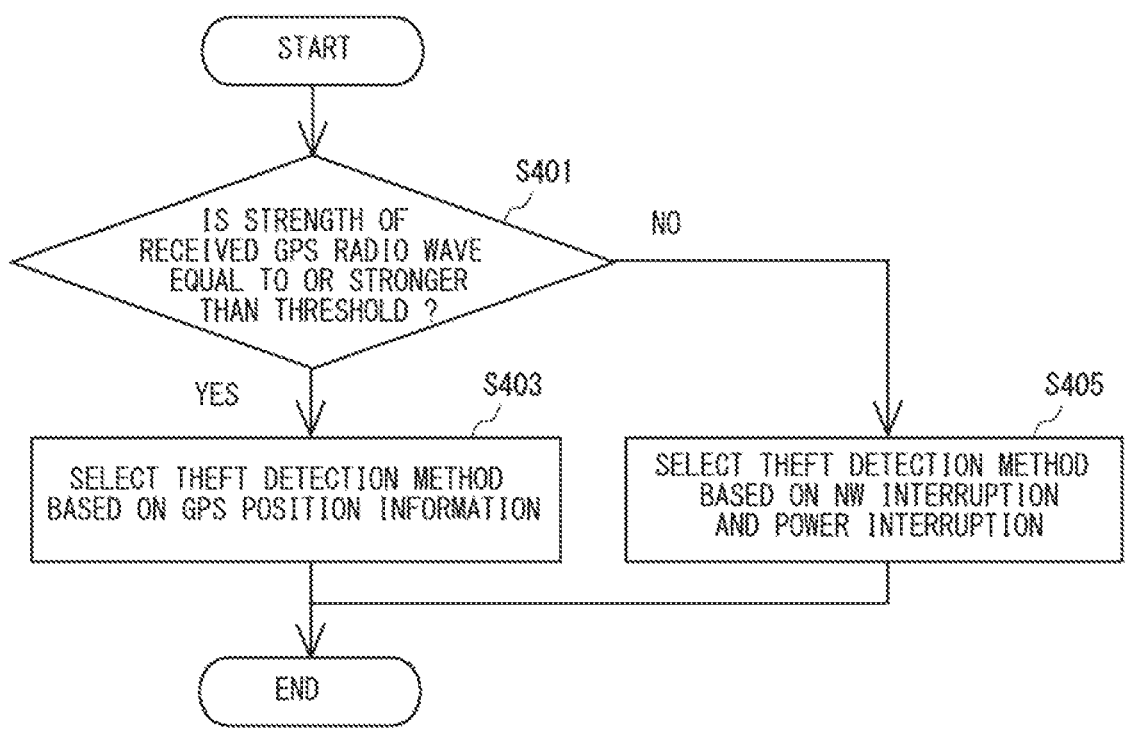
FIG. 4 is a flowchart for explaining a process for switching a theft detection method according to the first example embodiment.

A process for switching a theft detection method according to this example embodiment will be described with reference to a flowchart shown in FIG. 4.

Figure 2:
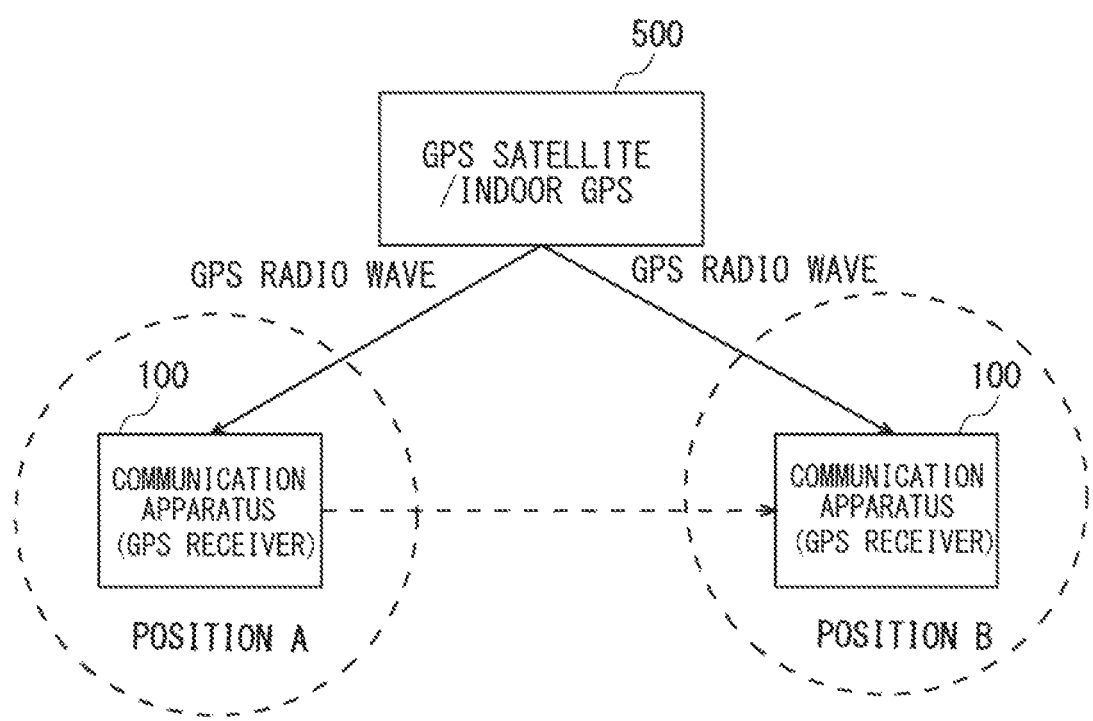
FIG. 2 is a diagram for explaining a theft detection method based on GPS position information.

When the strength of a GPS radio wave received by the GPS reception unit 103 of the communication apparatus 100 is equal to or stronger than a threshold (e.g., −158 dBm) (Yes at step S401), a theft detection method based on GPS position information like the one shown in FIG. 2 is selected (step S403). On the other hand, when the strength of the GPS radio wave received by the GPS reception unit 103 is weaker than the threshold (e.g., −158 dBm) (No at step S401), a theft detection method based on the interruption of communication and the power-up shown in FIG. 3 is selected (step S405).

Figure 5:
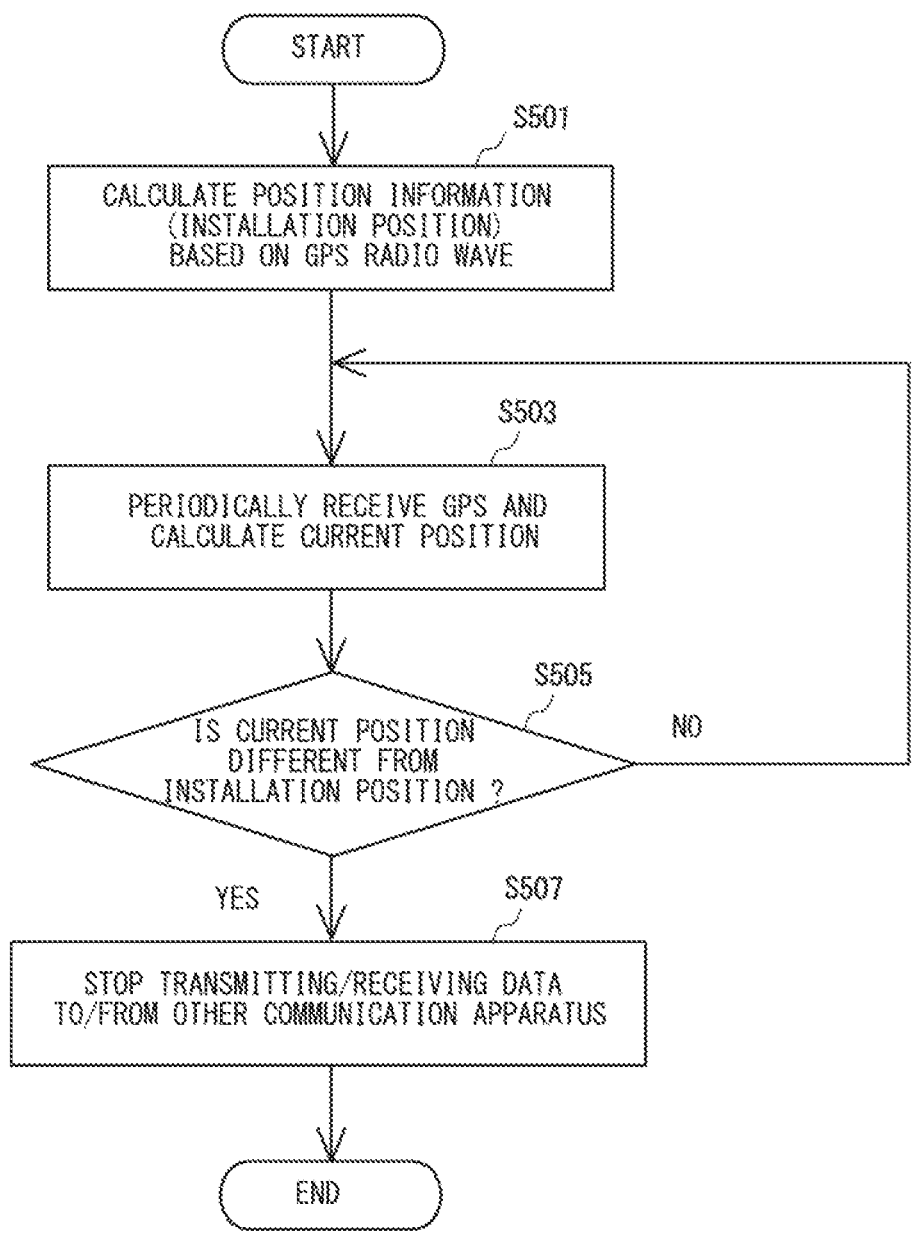
FIG. 5 is a flowchart showing an operation for suspending a transmitting/receiving function in the theft detection method shown in FIG. 2.

FIG. 5 is a flowchart showing an operation for suspending the transmitting/receiving function in the theft detection method shown in FIG. 2. In the switching process based on the theft detection method shown in FIG. 4, when the strength of the GPS radio wave is equal to or stronger than the threshold (e.g., −158 dBm), the process proceeds to the flowchart shown in FIG. 5.

The GPS reception unit 103 calculates the position of the communication apparatus 100 based on the GPS radio wave and registers the calculated position as an installation position (a position A in FIG. 2) (step S501). After that, the communication apparatus 100 periodically receives the GPS radio wave and calculates the current position (step S503). When the calculated current position differs from the registered installation position (Yes at step S505), it is determined that the communication apparatus 100 has been stolen and moved, so that the transmission/reception of data to/from the other communication apparatus is stopped (step S507). Note that the fact that "the current position differs from the installation position" may be interpreted as a state in which the current position is located outside a predetermined area in which the installation position is located (e.g., located outside the room in which the communication apparatus 100 was originally placed). On the other hand, when the calculated current position coincides with the registered installation position (No at step S505), the process in the step S503 is repeated.

Figure 6:
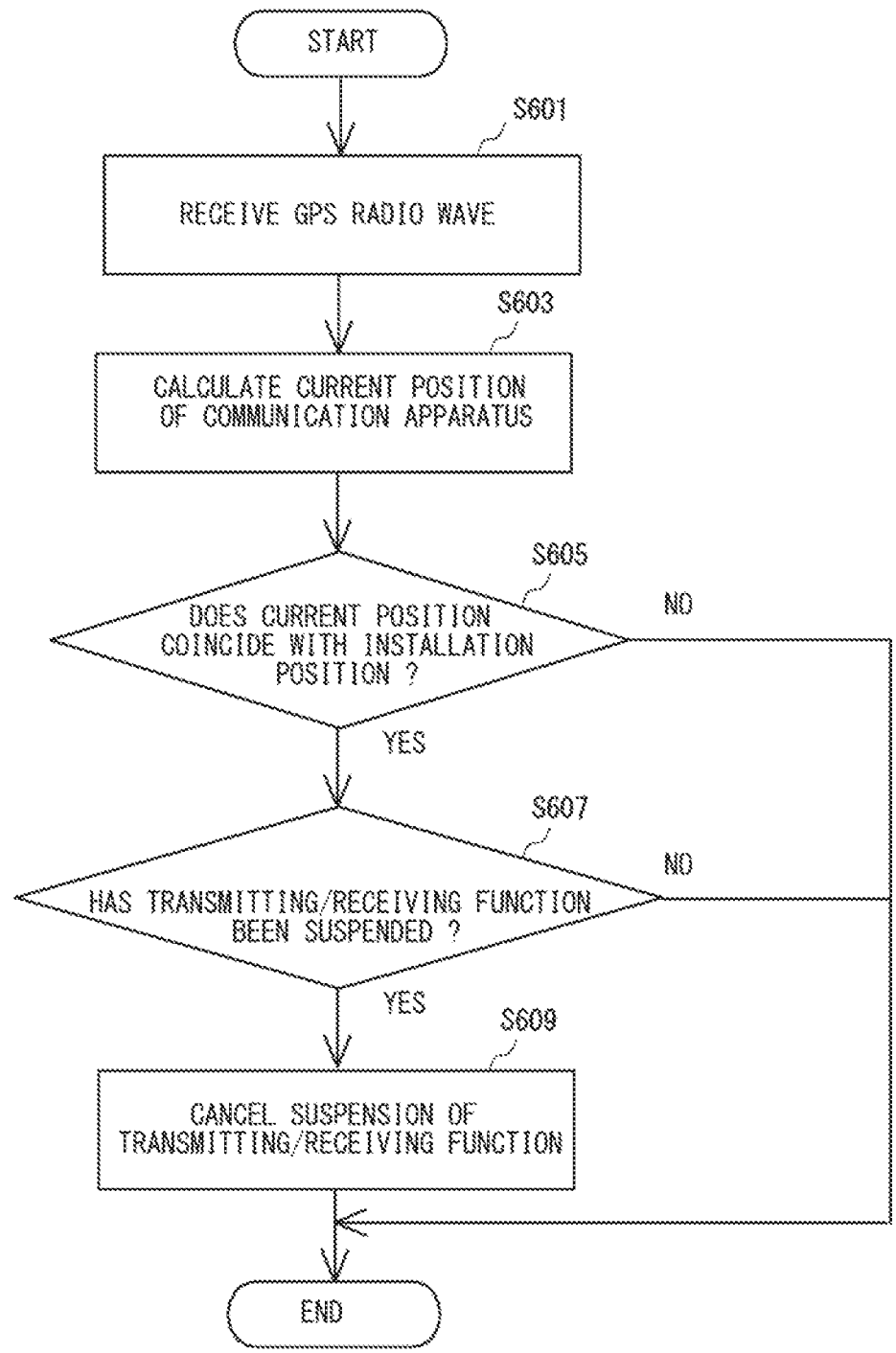
FIG. 6 is a flowchart showing an operation for canceling the suspension of the transmitting/receiving function (shown in FIG. 5)

Further, FIG. 6 is a flowchart showing an operation for cancelling the suspension of the transmitting/receiving function shown in FIG. 5. Firstly, when the GPS reception unit 103 of the communication apparatus 100 receives a GPS radio wave(s) (step S601), the current position of the communication apparatus 100 is calculated (step S603). When the current position coincides with the installation position (Yes at step S605) and the transmitting/receiving function has been suspended (Yes at step S607), the suspension of the transmitting/receiving function is cancelled (step S609). The fact that "the current position coincides with the installation position" may be interpreted as a state in which the current position is located within a predetermined area in which the installation position is located (e.g., located in the room in which the communication apparatus 100 was originally placed).

Figure 3:
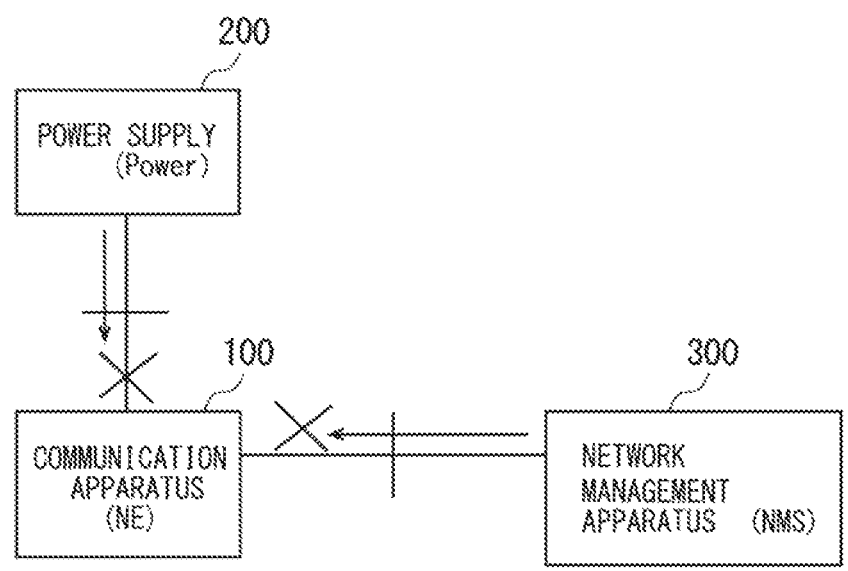
FIG. 3 is a diagram for explaining a theft detection method based on an interruption of electric power to a communication apparatus and an interruption of communication between the communication apparatus and a higher-level network management apparatus.
Figure 7:
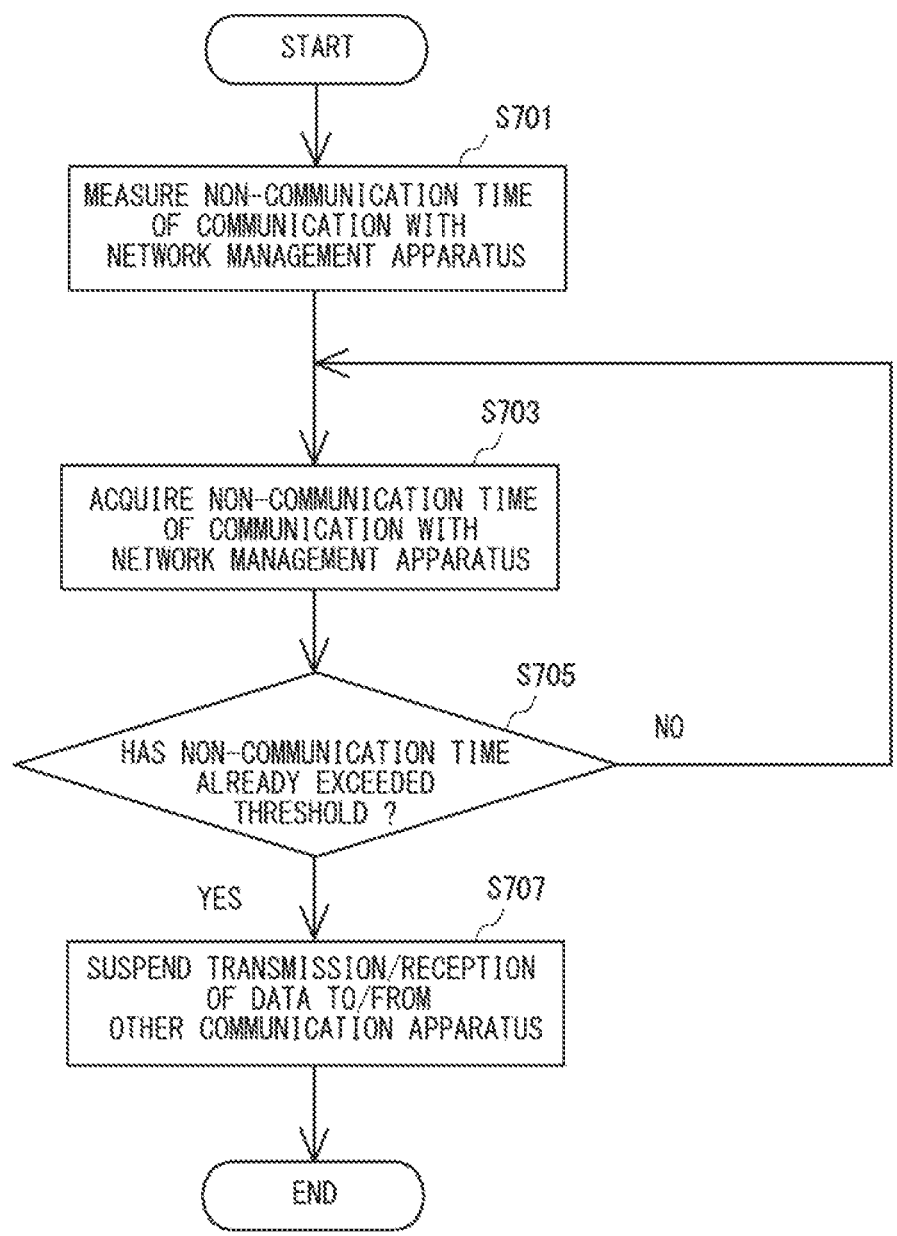
FIG. 7 is a flowchart showing an operation for suspending the transmitting/receiving function in the theft detection system shown in FIG. 3.

FIG. 7 is a flowchart showing an operation for suspending the transmitting/receiving function in the theft detection method shown in FIG. 3. The acquisition unit 102 measures a non-communication time during which no information for authentication is exchanged between the communication apparatus 100 and the network management apparatus 300. The acquisition unit 102 starts measuring a non-communication time when the communication apparatus 100 is powered on (step S701).

The control unit 106 acquires the non-communication time of the communication between the communication apparatus 100 and the network management apparatus 300 from the acquisition unit 102 (step S703). The control unit 106 determines whether or not the acquired non-communication time has exceeded the threshold for the non-communication time (step S705). Then, when the non-communication time has exceeded the threshold, the control unit 106 determines that the communication apparatus has been stolen and suspends the function of the transmission/reception unit 101 (step S707).

Figure 8:
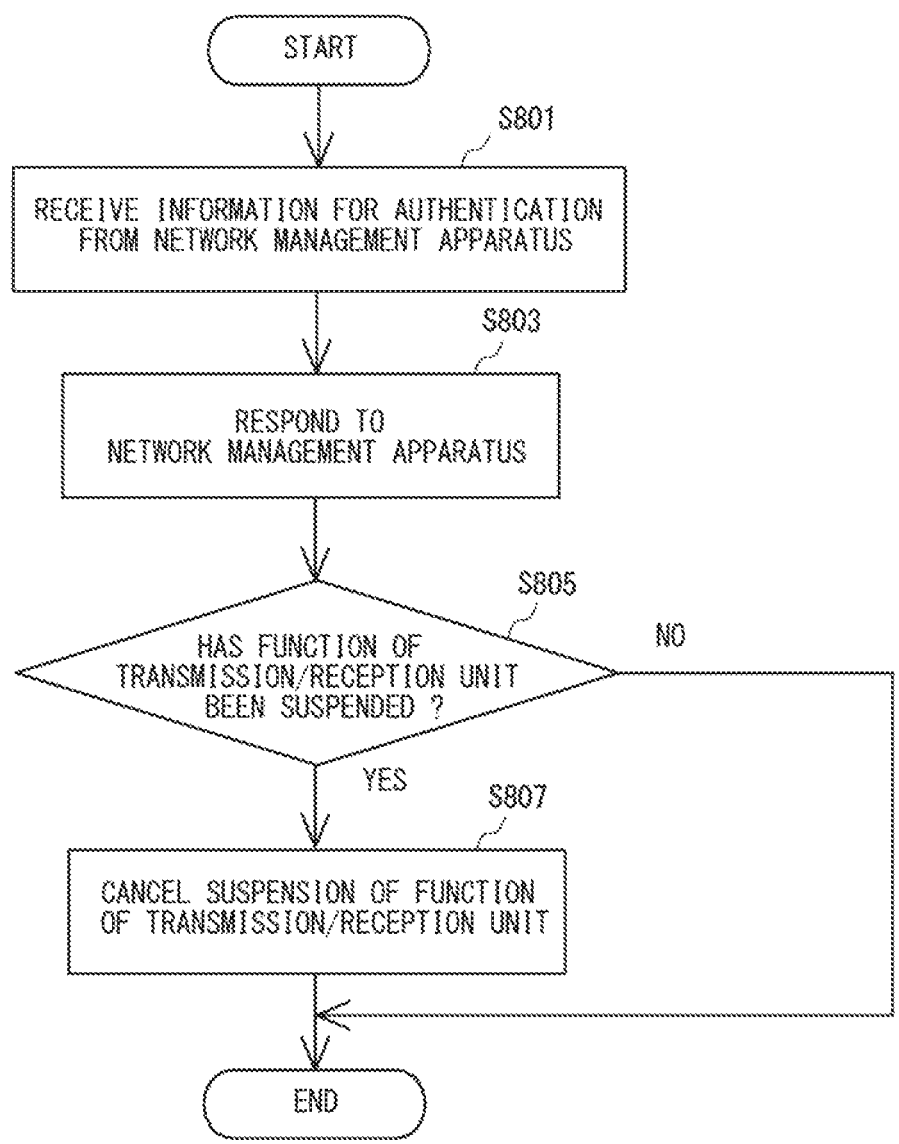
FIG. 8 is a flowchart showing an operation for canceling the suspension of the transmitting/receiving function (shown in FIG. 7)

Further, FIG. 8 is a flowchart showing an operation for canceling the suspension of the transmitting/receiving function (shown in FIG. 7). Firstly, when the acquisition unit 102 acquires information for authentication from the network management apparatus 300 (step S801), it sends back information indicating that the network management apparatus 300 is an assumed one to the network management apparatus 300 (step S803).

Further, the control unit 106 determines whether the function of the transmission/reception unit has been suspended (step S805). Then, when the function of the transmission/reception unit 101 has been suspended (Yes at step S805), the control unit 106 cancels the suspension of the function of the transmission/reception unit 101 (step S807).

As described above, according to this example embodiment, when the communication apparatus is stolen and powered on in a network in which the communication apparatus is illegally reused, the communication apparatus detects that the communication apparatus has been stolen and suspends the function of transmitting/receiving data to/from other communication apparatuses when the authentication information cannot be acquired from the network management apparatus within the predetermined time. By the above-described configuration, the communication apparatus can accurately detect a theft by itself and prevent it from being reused at a place where the communication apparatus has been illegally taken to.

Further, according to this example embodiment, even in the period during which the transmitting/receiving function is suspended, when the information for authentication is acquired from the network management apparatus, the suspension of the transmitting/receiving function is cancelled in response to the acquisition of the information. By the above-described configuration, it is possible to, when the communication apparatus is removed and reinstalled, instead of being stolen, or after the communication path between them is interrupted or a failure or the like occurs in the network management apparatus, automatically cancel the suspension of the transmitting/receiving function of the communication apparatus without trouble as soon as the communication apparatus and/or the network management apparatus are recovered. By the above-described configuration, it is possible to, by using a simple configuration, deter thieves from stealing communication apparatuses for the purpose of reusing them in different place.

Further, as described above for the procedure of processes performed in the communication apparatus in the above-described example embodiments, the present disclosure may be applied as a method for controlling communication performed by a communication apparatus that transmits/receives data to/from another communication apparatus connected to a network managed by a network management apparatus. The method for controlling communication includes: measuring a strength of a GPS radio wave; calculating information about a position of the communication apparatus based on the GPS radio wave and registers the calculated information about the position as an installation position of the communication apparatus when the strength of the GPS radio wave is equal to or stronger than a predetermined strength; periodically calculating, when the measured strength of the GPS radio wave is equal to or stronger than the predetermined strength, the information about the position of the communication apparatus based on the GPS radio wave or the like, using the calculated information of the position as a current position of the communication apparatus, comparing the current position of the communication apparatus with the registered installation position of the communication apparatus, and when the current position is located outside a predetermined area including the installation position, stopping a function of transmitting/receiving data to/from another communication apparatus connected to a network; and suspending, when the measured strength of the GPS radio wave is weaker than the predetermined strength, the function of transmitting/receiving data to/from the other communication apparatus connected to the network when information for authenticating the network management apparatus cannot be acquired from the network management apparatus within a predetermined time upon power-up. Note that other examples are the same as those described in the above-described various example embodiments.

Further, a communication control program is a program for causing a computer to perform such a method for controlling communication.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (Registered Trademark) Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

According to the present disclosure, it is possible to provide a communication apparatus, a communication system, a communication control method, and a communication control program capable of recognizing an environment (GPS availability) and switching a theft detection method according to the environment.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A communication apparatus comprising:
    a transmission/reception unit having a function of transmitting/receiving data to/from another communication apparatus connected to a network;
    an acquisition unit configured to acquire information for authenticating a network management apparatus from the network management apparatus, the network management apparatus being configured to manage the network;
    a GPS reception unit configured to receive a GPS radio wave;
    a measurement unit configured to measure a strength of the GPS radio wave;
    a registration unit configured to calculate information about a position of the communication apparatus based on the GPS radio wave and register the calculated information about the position as an installation position of the communication apparatus when the strength of the GPS radio wave measured by the measurement unit is equal to or stronger than a predetermined strength; and
    a control unit configured to, when the strength of the GPS radio wave measured by the measurement unit is equal to or stronger than the predetermined strength, periodically calculate the information about the position of the communication apparatus based on the GPS radio wave, use the calculated information of the position as a current position of the communication apparatus, compare the current position of the communication apparatus with the registered installation position of the communication apparatus, and when the current position is located outside a predetermined area including the installation position, suspend the function of the transmission/reception unit, and
    further configured to, when the strength of the GPS radio wave measured by the measurement unit is weaker than the predetermined strength, suspend the function of the transmission/reception unit when the acquisition unit cannot acquire the information from the network management apparatus within a predetermined time upon power-up.

2. The communication apparatus according to claim 1, wherein in a period during which the function of the transmission/reception unit is suspended, when the current position of the communication apparatus received by the GPS reception unit is located within a predetermined area including the installation position registered in the registration unit, the control unit cancels the suspension of the function of the transmission/reception unit.

3. The communication apparatus according to claim 1, wherein in a period during which the function of the transmission/reception unit is suspended, when the control unit acquires the information from the network management apparatus, the control unit cancels the suspension of the function of the transmission/reception unit.

4. The communication apparatus according to claim 1, wherein
    the acquisition unit measures a non-communication time during which no communication is performed with the network management apparatus, and
    the control unit suspends the function of the transmission/reception unit when the non-communication time exceeds the predetermined time.

5. The communication apparatus according to claim 4, wherein
    the acquisition unit stores the non-communication time in a non-volatile memory, and
    the control unit reads the non-communication time from the non-volatile memory upon power-up, and suspends the function of the transmission/reception unit when the non-communication time has already exceeded the predetermined time.

6. The communication apparatus according to claim 5, wherein the control unit suspends the function of the transmission/reception unit when a sum of the non-communication time read upon the power-up and the non-communication time measured after the power-up exceeds the predetermined time.

7. A communication system comprising:
    the communication apparatus according to claim 1; and
    a network management apparatus configured to transmit the information for the authentication.

8. A method for controlling communication performed by a communication apparatus configured to transmit/receive data to/from another communication apparatus connected to a network managed by a network management apparatus, the method comprising:
    measuring a strength of a GPS radio wave;
    calculating information about a position of the communication apparatus based on the GPS radio wave and registers the calculated information about the position as an installation position of the communication apparatus when the strength of the GPS radio wave is equal to or stronger than a predetermined strength;
    periodically calculating, when the measured strength of the GPS radio wave is equal to or stronger than the predetermined strength, the information about the position of the communication apparatus based on the GPS radio wave, using the calculated information of the position as a current position of the communication apparatus, comparing the current position of the communication apparatus with the registered installation position of the communication apparatus, and when the current position is located outside a predetermined area including the installation position, stopping a function of transmitting/receiving data to/from another communication apparatus connected to a network; and suspending, when the measured strength of the GPS radio wave is weaker than the predetermined strength, the function of transmitting/receiving data to/from the other communication apparatus connected to the network when information for authenticating the network management apparatus cannot be acquired from the network management apparatus within a predetermined time upon power-up.

9. A non-transitory computer readable medium storing a communication control program for a communication apparatus configured to transmit/receive data to/from another communication apparatus connected to a network managed by a network management apparatus, the communication control program being adapted to cause a computer to perform:

a process of measuring a strength of a GPS radio wave;

a process of calculating information about a position of the communication apparatus based on the GPS radio wave and registers the calculated information about the position as an installation position of the communication apparatus when the strength of the GPS radio wave is equal to or stronger than a predetermined strength;

a process of periodically calculating, when the measured strength of the GPS radio wave is equal to or stronger than the predetermined strength, the information about the position of the communication apparatus based on the GPS radio wave, using the calculated information of the position as a current position of the communication apparatus, comparing the current position of the communication apparatus with the registered installation position of the communication apparatus, and when the current position is located outside a predetermined area including the installation position, stopping a function of transmitting/receiving data to/from another communication apparatus connected to a network; and a process of suspending, when the measured strength of the GPS radio wave is weaker than the predetermined strength, the function of transmitting/receiving data to/from the other communication apparatus connected to the network when information for authenticating the network management apparatus cannot be acquired from the network management apparatus within a predetermined time upon power-up.

* * * * *